M. H. McCORMICK.
BAND SAW.
APPLICATION FILED SEPT. 30, 1919.

1,354,439.

Patented Sept. 28, 1920.

WITNESSES

INVENTOR
M. H. McCORMICK,
BY
ATTORNEYS

UNITED STATES PATENT OFFICE.

MERTON H. McCORMICK, OF NEW WILLARD, TEXAS.

BAND-SAW.

1,354,439.  Specification of Letters Patent.  Patented Sept. 28, 1920.

Application filed September 30, 1919. Serial No. 327,381.

*To all whom it may concern:*

Be it known that I, MERTON H. McCORMICK, a citizen of the United States, and a resident of New Willard, in the county of Polk and State of Texas, have invented a new and Improved Band-Saw, of which the following is a full, clear, and exact description.

This invention relates to band saws for sawing lumber and for other purposes, and has reference more particularly to a saw of this kind in which the band is reinforced at the gullets separating the saw-teeth.

An object of the invention is to provide a simple and efficient band saw, which can be inexpensively produced, which will not readily crack or otherwise deteriorate in use, and which is capable of long and hard service.

Band saws in use at present usually have the teeth formed on one edge of the band, and are rolled or stretched in such a manner that the center between the teeth and the opposite edge of the band is the longest part of the saw. The back edge is somewhat longer than the front or tooth edge. The band saw is stretched tightly on the band saw wheels and the maximum fiber stress, due to the tension, obtains at the throat of the teeth, and when cracks form in the saw they start from the surface on this throat or gullet. It is a purpose of this invention so to reinforce the gullets of the teeth that the tendency for cracks to form at this point will be reduced to a minimum.

Reference is to be had to the accompanying drawing forming a part of this specification in which it is understood that the drawing is merely illustrative of one example of the invention, and in which—

Figure 1:
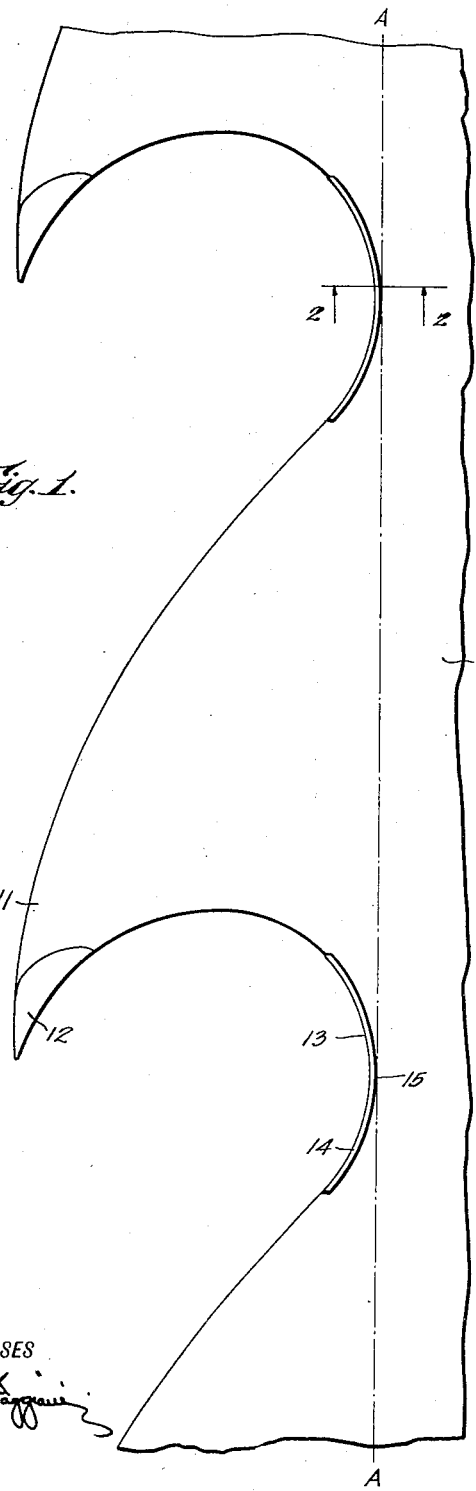
Figure 1 is an enlarged fragmentary elevation of the teeth of a band saw.
Figure 2:
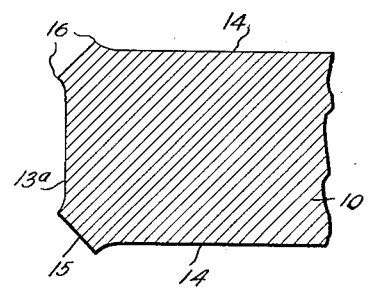
Fig. 2 is a section through Fig. 1 on line 2—2.

Referring to the accompanying drawing by numerals, 10 indicates the body of a flat band saw, provided on one edge with teeth 11 terminating in hardened tooth points 12, and forming the gullets or throats 13 between each of the teeth. As is commonly practised when the body 10 of the saw is stretched tightly over the band wheels, the shortest portion of the band saw, and therefore the portion to receive the greatest strain of the tension is along the line A—A, parallel to the throats 13 of the teeth. Since the least width of the band saw is adjacent each throat 13, the maximum fiber stress will occur locally along the surface 13$^a$ of the throat 13, and if cracks form they will start at the surface 13$^a$ and extend inwardly from the throat. To reinforce the surface 13$^a$, bevels 15 are formed by hammering, rolling or by other means, on the edges formed by the intersection of the surface 13$^a$ and the parallel surfaces 14 of the band saw. This hammering or rolling operation forms ribs 16, which reinforce the edges of the throat 13 and also compresses the metal of the beveled surface and directly beneath said surface so that the metal is of greater density and of considerably greater strength and tenacity. The tendency for cracks to start from the surface 13$^a$ is therefore reduced to a minimum. It is necessary to bevel the edges of the gullets each time the teeth are sharpened as the gullets are ground deeper during each sharpening operation.

While the formation of these bevels 15 adds very little to the cost of manufacture of the band saw, or to the cost of resharpening the teeth, it has been found that the life of the saw is greatly lengthened by thus reinforcing and strengthening the point of greatest weakness.

I would state in conclusion that while the illustrated example constitutes a practical embodiment of my invention, I do not limit myself strictly to the mechanical details herein illustrated, since manifestly the same can be considerably varied without departure from the spirit of the invention as defined in the appended claims.

Having thus described my invention, I claim as new and desire to secure by Letters Patent:

1. A band saw comprising a flat continuous band, a plurality of teeth formed on one edge of said band, and a throat formed between each of said teeth, the edges of said throats being upset by hammering so as to form reinforcing ribs.

2. A band saw comprising a flat continuous band, a plurality of teeth formed on one edge of said band, a throat between each of said teeth, the edges of said throat being beveled by rolling so as to form a plurality of reinforcing ribs.

3. A band saw comprising a band, a plurality of saw-teeth formed on one edge of said band so as to form gullets between the teeth, and bevels formed by pressure on the edges of said gullets so that the metal on and directly under said beveled surfaces has a greater density and tenacity.

4. A band saw comprising a band and a plurality of saw teeth formed on one edge of said band so as to form gullets between the teeth, the edges of said gullets being rolled at an inclination so that reinforcing ribs are formed having a greater density and tenacity than the body of the band.

5. A band saw comprising a band and a plurality of saw teeth formed on one edge of said band so as to form gullets between the teeth, the edges of said gullets being rolled at an inclination so that bevels are formed in which the metal on and directly under said beveled surfaces has a greater density and tenacity than the body of the band.

MERTON H. McCORMICK.